(12) United States Patent
Roche et al.

(10) Patent No.: US 7,574,866 B2
(45) Date of Patent: Aug. 18, 2009

(54) TURBO-JET ENGINE WITH A PROTECTIVE SCREEN OF THE FUEL MANIFOLD OF A BURNER RING, THE BURNER RING AND THE PROTECTIVE SCREEN

(75) Inventors: Jacques Andre Michel Roche, Lisses (FR); Alain Pierre Page, Montgeron (FR); Stephane Henri Guy Touchaud, Paris (FR); Nicolas Pommier, Brunoy (FR)

(73) Assignee: SNECMA, Paris (FR)

( * ) Notice: Subject to any disclaimer, the term of this patent is extended or adjusted under 35 U.S.C. 154(b) by 540 days.

(21) Appl. No.: 11/177,297

(22) Filed: Jul. 11, 2005

(65) Prior Publication Data
US 2006/0016193 A1 Jan. 26, 2006

(30) Foreign Application Priority Data
Jul. 23, 2004 (FR) .................................. 04 08153

(51) Int. Cl.
*F02K 3/10* (2006.01)
(52) U.S. Cl. ............................. 60/761; 60/764; 60/766
(58) Field of Classification Search ............ 60/761–766
See application file for complete search history.

(56) References Cited
U.S. PATENT DOCUMENTS
2,927,423 A * 3/1960 Wisniowski ................. 60/765

| 4,899,539 | A |   | 2/1990  | Gastebois et al. |
|-----------|---|---|---------|------------------|
| 5,297,391 | A |   | 3/1994  | Roche |
| 5,400,589 | A | * | 3/1995  | Mahias et al. ................. 60/762 |
| 6,112,516 | A | * | 9/2000  | Beule et al. .................... 60/765 |
| 2007/0227151 | A1 | * | 10/2007 | Bunel et al. .................... 60/761 |

FOREIGN PATENT DOCUMENTS

| DE | 1 133 185 | 7/1962 |
|----|-----------|--------|
| FR | 1 245 920 | 11/1960 |
| FR | 2 709 342 | 3/1995 |
| GB | 1092643 | 11/1967 |

* cited by examiner

*Primary Examiner*—William H Rodriguez
(74) *Attorney, Agent, or Firm*—Oblon, Spivak, McClelland, Maier & Neustadt, P.C.

(57) ABSTRACT

A double flow turbo-jet engine includes a re-heating channel of the primary flow and an ejection nozzle, the secondary flow emerging at least partially in the primary flow upstream of the re-heating channel, the re-heating channel including a burner ring, including a flame holder gutter in the form of a ring portion whereof the upstream section is situated in the secondary flow, receiving a fuel manifold and a protective tubular screen of the manifold. The gutter includes an upstream recess linked with the secondary flow, and the screen includes, on its upstream section, at least one ventilation orifice of the space situated between the screen and the manifold.

4 Claims, 3 Drawing Sheets

TURBO-JET ENGINE WITH A PROTECTIVE SCREEN OF THE FUEL MANIFOLD OF A BURNER RING, THE BURNER RING AND THE PROTECTIVE SCREEN

The invention relates to a turbo-jet engine including a re-heating channel of the primary gas flow, a burner ring and a protective screen of the fuel manifold of the burner ring. The invention also relates to a burner ring and a protective screen for the turbo-jet engine.

Turbo-jet engines with after burner comprise generally from the upstream portion to the downstream portion, in the flow direction of the gases, one or several compressor stages, a combustion chamber, one or several turbine stages, a re-heating channel or after burner channel, and an ejection nozzle. The primary gas flow is compressed in the compressor stages, partakes of the combustion of the fuel in the combustion chamber, expands in the turbine stages and enables new combustion of fuel, thanks to the oxygen still present therein, in the re-heating channel before expanding in the ejection nozzle.

The re-heating channel comprises generally, at input, flame holder arms, extending radially in the primary gas flow and comprises a fuel injector which sprays said fuel into the gas stream, downwardly. The fuel is ignited and the flames are, because of the sectional shape of the arms causing a depression, "held" in the walls of the arms.

There may also be provided a burner ring, placed concentrically to the casing of the re-heating channel and operating along the same principle. The ring comprises generally an outer enclosure in the form of a gutter, including a U-shaped section, open downward of the re-heating channel, in the gas stream of the primary flow, wherein a fuel manifold is situated, of circular section, seen as an axial sectional view, whereof the purpose is to spray the fuel downward.

Downstream of the manifold, the fuel is ignited, and the flame is held in the gutter of the ring because of the shape of the latter. Consequently, the re-circulations of gas in the enclosure of the gutter are re-circulations of very hot gases. For enhanced thermal protection, the fuel manifold is surrounded by an anti-radiation screen. Such screen includes fuel passage orifices, corresponding to orifices of the manifold, generally gathered in twos, in a same axial plane, at regular angular positions on the ring.

For various profitability reasons, it has been attempted to increase the opening dimensions of the gutter. The re-circulation of the hot gases has been increased accordingly, and deformations, cracks and burns have been observed on the anti-radiation screen, in particular between the fuel passage orifices downstream of the screen "seeing" the flame. In such zones, the protection of the fuel manifold is consequently less efficient, thereby causing a risk of coking of the manifold.

The purpose of the present invention is to improve the cooling process of the anti-radiation screen.

To that effect, the invention relates to a double flow turbo-jet engine, including one or several compressor stages, a combustion chamber, one or several turbine stages, a re-heating channel of the primary flow and an ejection nozzle, the secondary flow emerging at least partially in the primary flow upstream of the re-heating channel, the re-heating channel including a burner ring, containing a flame holder gutter in the form of a ring portion whereof the upstream section is situated in the secondary flow, receiving a fuel manifold and a protective tubular screen of the manifold, characterised in that the gutter includes an upstream recess linked with the secondary flow, and the screen includes, on its upstream section, at least one ventilation orifice of the space situated between the screen and the manifold.

Preferably, as the gutter includes an upstream recess linked with the secondary flow, the ventilation means comprise at least one ventilation orifice situated on the upstream portion of the screen.

Advantageously in such a case, the manifold including at least one pair of fuel spraying orifices, the screen including at least one pair of corresponding orifices, a ventilation orifice is drilled on the screen at the same angular position as the pair of orifices.

Advantageously still, as the screen includes a plurality of pairs of orifices, it comprises a ventilation orifice drilled at the same angular position of each pair of orifices.

The invention also relates to a burner ring for a turbo-jet engine, including a flame holder gutter, a fuel manifold and a protective screen of the manifold, characterised in that it comprises the features of the ring described previously.

The invention still relates to a protective screen of a burner ring manifold for a turbo-jet engine, characterised in that it comprises at least one pair of orifices and a ventilation orifice situated in the transversal plane of the pair of orifices.

Preferably, the screen comprises a plurality of pairs of orifices and a ventilation orifice situated in the transversal plane of each pair of orifices.

The invention will be understood better using the following description of the preferred embodiment of the turbo-jet engine of the invention, with reference to the appended drawings, whereon:

Figure 1:
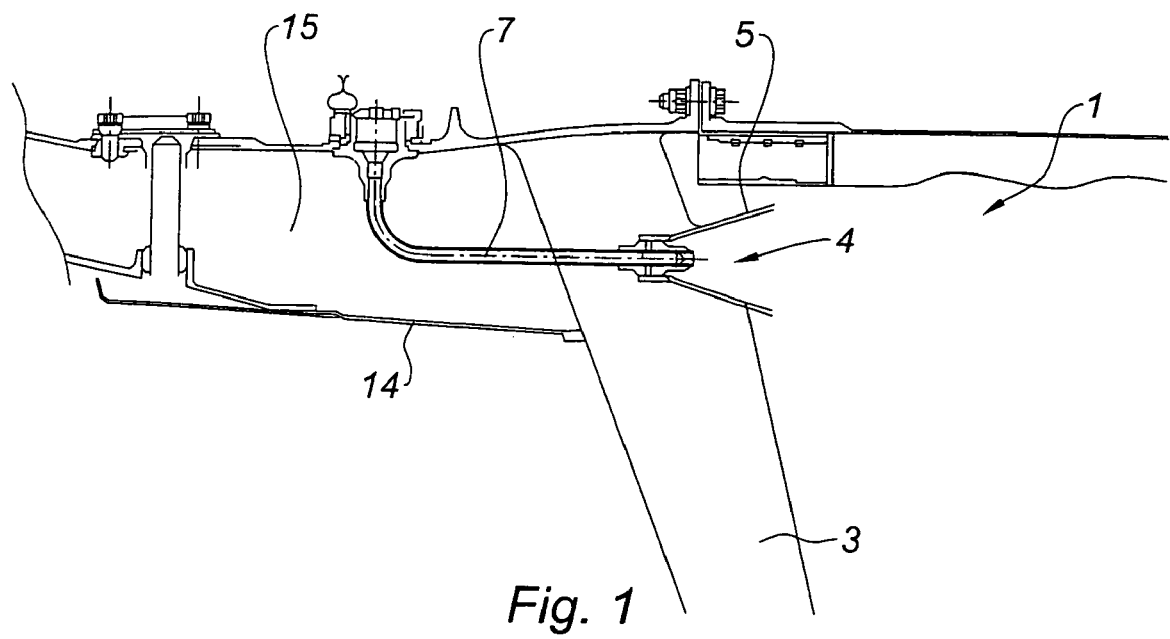
FIG. 1 shows a partial axial sectional view of the preferred embodiment of the turbo-jet engine of the invention, in the zone of the burner ring.

With reference to FIG. 1, the turbo-jet engine of the invention, extending globally along an axis A, comprises several compressor stages, a combustion chamber, several turbine stages, a re-heating channel of the primary flow 1 and an ejection nozzle.

Figure 2:
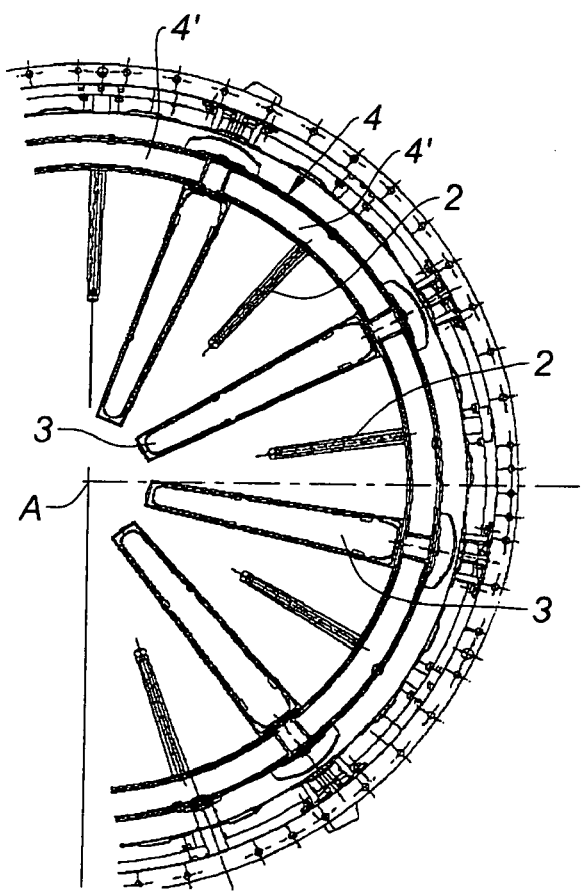
FIG. 2 shows a partial cross-sectional view of the turbo-jet engine of the invention.

With reference to FIG. 2, at input of the re-heating channel 1, fuel injector arms 2 extend radially, whereof the purpose is to spray fuel towards the flame holder arms 3, situated downstream of the fuel injector arms 2 and extending radially in the re-heating channel 1.

By the flame holder arms 3, the secondary flow, i.e. the cold air flow which has not run through the combustion chamber, emerges in the primary flow. A ferule 14 is placed upstream of the arms 3 and delineates a secondary flow channel 15. Downstream of this ferule 14, this secondary flow is mixed, at least partially, with the primary flow, in the re-heating channel 1.

The number of flame holder arms 3, nine in this case, is the same as that of the fuel injector arms 2 and are offset angularly relative to the latter, so that, on a front view, each fuel injector arm 2 is situated between two consecutive flame holder arms 3, equidistant therefrom. The fuel injector arms 2 are radially smaller than the flame holder arms 3.

Close to the casing of the re-heating channel 1, the flame holder arms 3 support a burner ring 4. Such ring 4 is made of a plurality of portions of ring 4', here nine in number, extending concentrically to the casing of the re-heating channel 1, between two successive flame holder arms 3. It will be referred below to the ring 4, by which is meant in fact a portion of ring 4', and the constitutive elements of the ring 4 will be in such a case elements constituting a portion of ring 4', and therefore only extending on a truncated ring and not along a closed annular circumference.

The fuel injector arms 2 extend radially, perpendicular to the axis of the turbo-jet engine. The flame holder arms 3 extend radially, tilted downward, from their base, relative to the perpendicular to the axis of the turbo-jet engine contained in the axial plane of the arms 3. The fuel injector arms 2 spray fuel downward. The flame holder arms 3 do the same, and ensure moreover the ignition of the fuel and the catching of the flames by its outer walls, sized accordingly.

The burner ring 4 includes a flame holder gutter 5, delineating its open external enclosure, which exhibits on an axial sectional view, a U-shaped section, whereof the legs are turned downward. The gutter extends along an annular direction, or generatrix. The external leg of the U is greater than the internal leg, and the legs of the U are not parallel; it rather looks like a rounded base V; it will be referred to later as a U-shaped section.

The gutter 5 is placed outside, just downstream of the ferule 14. Thus, the upstream wall forming the base of its U-shaped section is in contact with the secondary cold flow, as well as its downstream walls forming the legs of its U-shaped section, whereof the purpose is to catch the flames of the re-heating channel 1, are subjected directly to the heat thereof.

Figure 3:
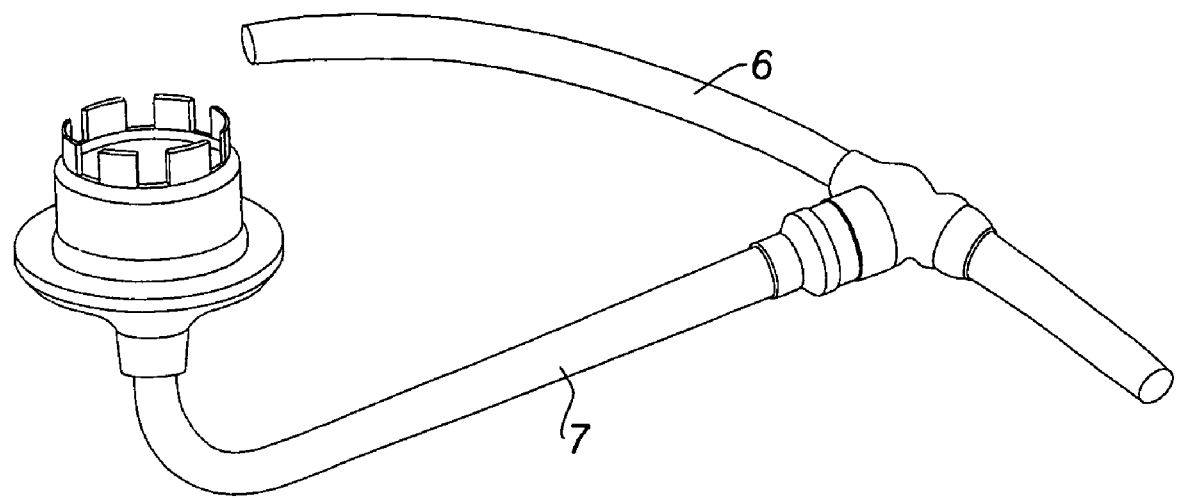
FIG. 3 shows a perspective view of the fuel manifold of the burner ring of the turbo-jet engine of the invention.
Figure 6:
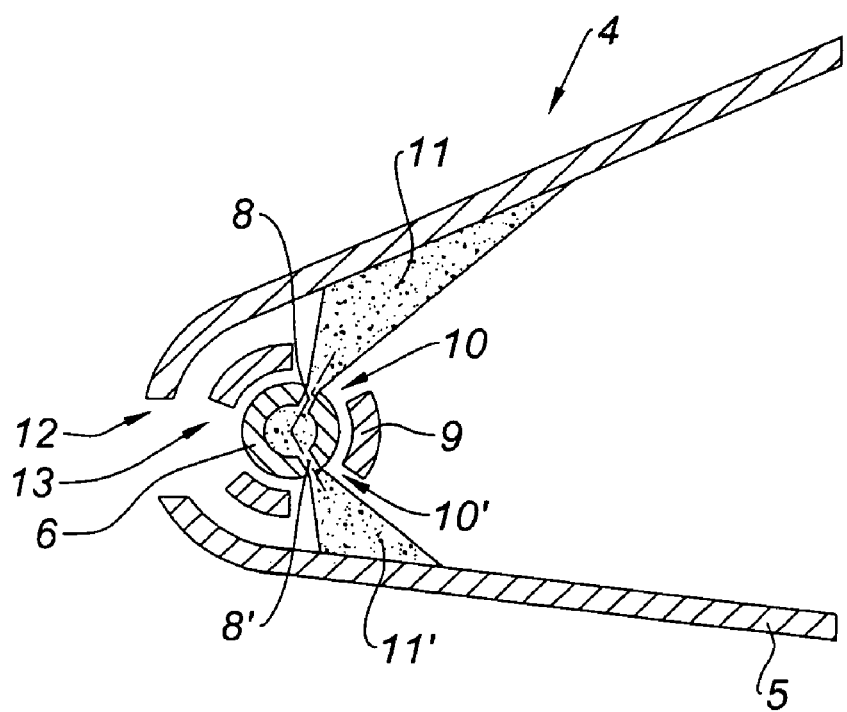
FIG. 6 shows an axial sectional view of the burner ring of the turbo-jet engine of the invention, in a plane including a pair of orifices.

With reference to FIG. 3, close to the base of the U, the gutter 5 receives a fuel manifold 6, of circular section, seen as an axial sectional view and matching the circumferential shape of the gutter 5. The manifold 6 is supplied with fuel by a longitudinal feeding ductwork 7, connected thereto from its upstream side. With reference to FIG. 6, it comprises, arranged at regular angular positions, pairs of circular orifices 8, 8' for fuel spraying. The orifices of a same pair of orifices 8, 8' are situated on the same axial plane and are symmetrical relative to one another with respect to the plane perpendicular to said axial plane, parallel to the axis A of the turbo-jet engine and intersecting the section of the manifold 6, at the angular position of the orifices 8, 8', into two equal semi-circles. The orifices 8, 8' are situated in the downstream portion of the fuel manifold 6.

Figure 4:
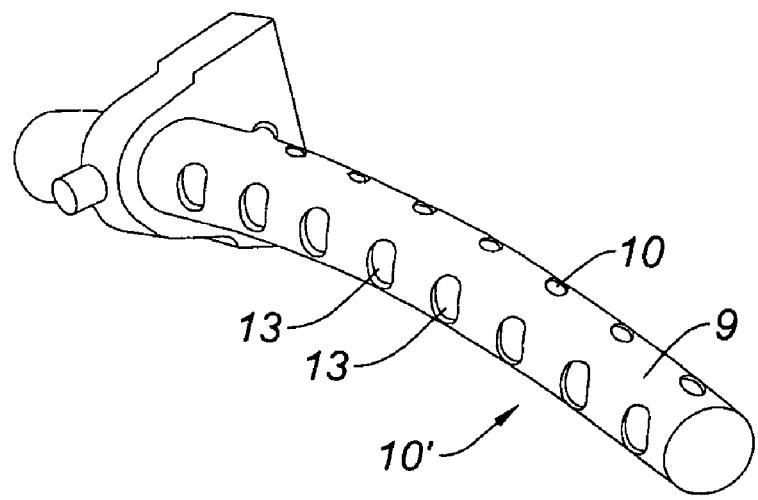
FIG. 4 shows a perspective view of the anti-radiation screen of the burner ring of the turbo-jet engine of the invention.

With reference to FIG. 4, the manifold 6 is enveloped in a anti-radiation screen 9, of same tubular shape as the manifold 6 but whereof the section forms a circle of larger diameter, whereof the purpose is to protect the manifold 6 from the radiations of the flames situated downstream, here caught by the walls corresponding to the legs of the U-shaped section of the gutter 5.

The screen 9 comprises, similarly to the previous art, pairs of circular fuel passage orifices 10, 10', whereof the orifices 10, 10' are each in the angular extension, from the centre of the circle formed by the axial section of the manifold 6, of an orifice 8, 8', respectively, of a pair of orifices 8, 8' of the manifold 6. The orifices 10, 10' of the screen 9 have a greater diameter than the orifices 8, 8' of the manifold 6, in order to compensate for the opening of the fuel jet 11, 11', respectively, as can be seen on FIG. 6.

The gutter 5 of the burner ring 4 includes, at its wall corresponding to the base of its U-shaped section, i.e. on the upstream side, a transversal undercut 12 which follows its generatrix. Such undercut 12 is in communication with the secondary flow channel 15 of the turbo-jet engine. The secondary air flow will therefore cool down the anti-radiation screen 9 via the transversal undercut 12. Such undercut 12 may be in the form of a continuous undercut along the generatrix of the gutter 5, with linking tabs between its external and internal edges, or may be replaced with a series of bores.

The anti-radiation screen 9 of the invention differs from the screens of the previous art by the presence, at the same angular position as the pairs of orifices 10, 10', of upstream circular orifices 13, for the ventilation of the zone situated between the manifold 6 and the screen 9.

Figure 5:
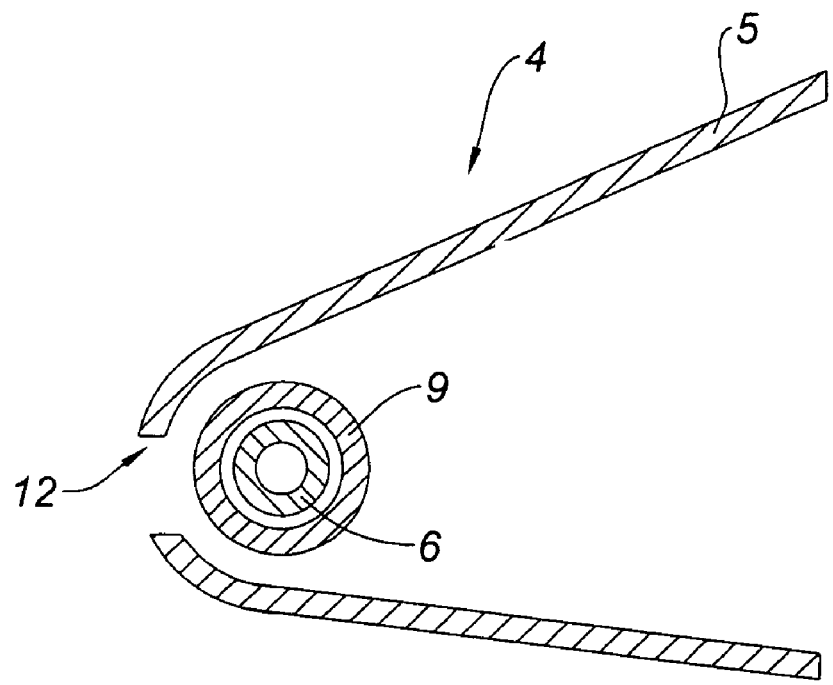
FIG. 5 shows an axial sectional view of the burner ring of the turbo-jet engine of the invention, in a plane not including any pairs of orifices.

With reference to FIG. 5, in a zone of the anti-radiation screen 9 not including any orifices 10, 10', the air of the secondary flow runs through the undercut of the gutter 5 and impacts the wall of the screen 9 on its upstream portion. The downstream portion of the screen, facing the flame caught with the trailing edges of the walls of the gutter 5, is cooled down by conduction. Indeed, in this orifice-free zone, there is continuity between the upstream portion and the downstream portion of the screen 9; the cooling down effect provided by the impact of the upstream portion by the air of the secondary flow is therefore transmitted by conduction to its downstream portion. The screen 9 is hence cooled down properly and ensures thermal protection of the fuel manifold 6.

With reference to FIG. 6, in a zone of the anti-radiation screen 9 including a pair of orifices 10, 10', the air of the secondary flow runs through the undercut of the gutter 5, then through the ventilation orifice 13 of the screen 9. II will then cool down not only upstream portions of the screen 9 situated around the ventilation orifice 13, but also the space between the manifold 6 and the screen 9 then, by circulating along such space, the downstream portion of the screen 9. The downstream portion of the screen 9, in particular that situated between two orifices 10, 10', is hence cooled down, which enables to avoid the shortcomings mentioned above.

Thanks to the invention, the downstream portion of the screen 9 is cooled down in the zones of its orifices 10, 10', which was not possible with the screens of the previous art, since the conduction of heat from the upstream portion to the downstream portion could not take place, whereas both these portions were not connected continuously because of the orifices 10, 10'. Moreover the space situated between the manifold 6 and the screen 9 is ventilated, in the zones including the orifices 10, 10'. This is obtained by drilling a ventilation orifice 13 in the transversal plane, relative to the shape of the screen 9, i.e. axial relative to the turbo-jet engine, of each of the pairs of orifices 10, 10' therein contained.

The invention claimed is:

1. A double flow turbo-jet engine, including a re-heating channel of a primary flow, a secondary flow emerging at least partially in the primary flow upstream of the re-heating channel, wherein upstream is defined with respect to a direction of flow of exhaust gases through said turbo-jet engine, the re-heating channel including a burner ring, including a flame holder gutter in the form of a ring portion whereof an upstream section is situated in the secondary flow, receiving a fuel manifold and a protective tubular screen of the manifold, wherein the gutter includes an upstream recess linked with the secondary flow, and the screen includes, on its upstream section, at least one ventilation orifice of a space situated between the screen and the manifold, wherein the manifold includes at least one pair of fuel spraying orifices, the screen includes at least one pair of corresponding orifices, and wherein a ventilation orifice is drilled on the screen at a same angular position for the pair of orifices.

2. A turbo-jet engine according to claim 1 wherein the screen includes a plurality of pairs of orifices, the screen comprises a ventilation orifice drilled at a same angular position for each pair of orifices.

3. A burner ring for a turbo-jet engine, including a flame holder gutter in the form of a partial ring and whereof a base is upstream with respect to a direction of flow of exhaust gases through said turbo-jet engine, a fuel manifold and a protective screen of the manifold being received in the gutter, wherein the gutter includes an upstream recess, and the screen includes, on its upstream section, at least one ventilation orifice of a space situated between the screen and the manifold, wherein the manifold includes at least one pair of fuel spraying orifices, the screen includes at least one pair of corresponding orifices, and wherein a ventilation orifice is drilled on the screen at a same angular position for the pair of orifices.

4. A burner ring according to claim 3, wherein the screen including a plurality of pairs of orifices, the screen comprises a ventilation orifice drilled at the same angular position for each pair of orifices.

* * * * *